Sept. 1, 1964  G. W. EHRSAM, JR., ETAL  3,146,623
SPIN-TEST AND BALANCING MACHINE
Filed March 17, 1958  3 Sheets-Sheet 1

INVENTORS
George W. Ehrsam Jr
Robert E. Sebring
Richard S. Wilkins
BY Alexander & Dowell
ATTORNEYS Sept. 1, 1964 G. W. EHRSAM, JR., ETAL 3,146,623
SPIN-TEST AND BALANCING MACHINE
Filed March 17, 1958 3 Sheets-Sheet 2

INVENTORS
George W. Ehrsam jr
Robert E. Sebring
Richard S. Wilkins

BY *Russell L. Dowell*

ATTORNEYS

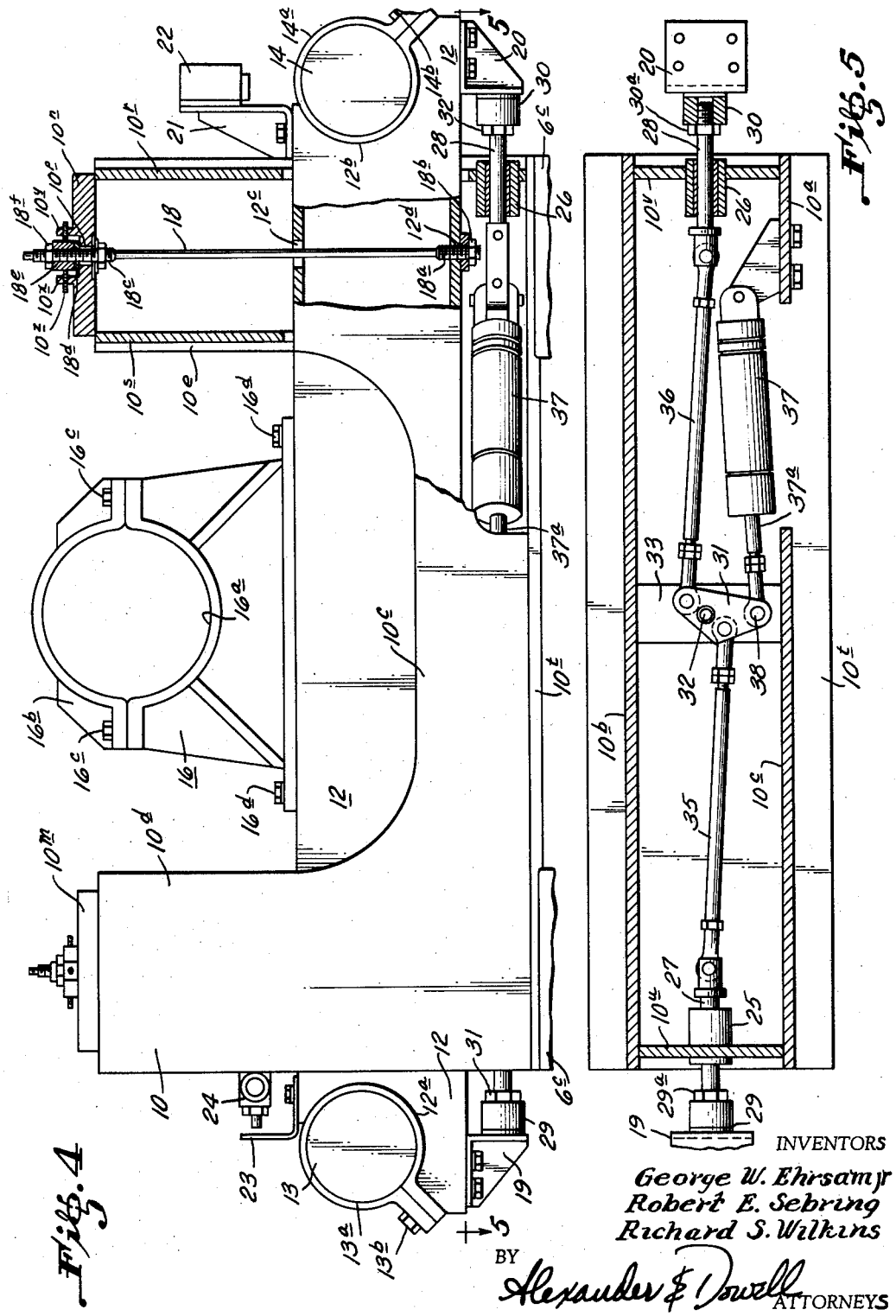

3,146,623
SPIN-TEST AND BALANCING MACHINE
George W. Ehrsam, Jr., Alexandria, Robert E. Sebring,
Fairfax, and Richard S. Wilkins, Alexandria, Va., assignors to American Machine & Foundry Company, a corporation of New Jersey
Filed Mar. 17, 1958, Ser. No. 722,030
12 Claims. (Cl. 73—460)

This invention relates to rotor-testing equipment intended for use in spin-testing and rotor-balancing over ranges of angular velocity extending well beyond the ranges of machines currently used in connection with the balancing of very large rotors.

The present invention will be described with particular reference to large high-speed rotors such as those employed in turbo-jet engines. These rotors comprise a shaft carrying a plurality of turbine stages axially spaced along the shaft. If the shaft could be made perfectly rigid, then the rotor could be balanced at a low angular velocity, and such balance would remain true at higher shaft speeds. However, because of the length of shaft necessary to mount the desired number of turbine stages, and because of the great weight of the completed rotor, the shaft does not remain rigid, but exhibits a certain amount of flexibility. This flexibility, even though small, makes it highly impracticable, if not impossible, to obtain a true dynamic balance of the rotor at all speeds within its operating range. Flexure of the shaft varies at different speeds and the rotor exhibits vibration amplitudes and frequencies which change with shaft speed. As a practical matter, it is therefore necessary to test the rotors over their entire usable speed range. Furthermore, it is necessary to spin-test a rotor by rotating it at speeds well beyond its normal operating range for the purpose of proving freedom from defects in design and materials, and freedom from excessive unbalances at speeds both within the operating range of the rotor and also at considerable overspeeds. Some of the larger rotors tested in the machines built according to this specification weigh 2000 lbs. and are 8 feet long. These large rotors are spin-tested and balanced at speeds up to 10,000 r.p.m., and smaller rotors are often spin-tested at speeds up to 30,000 r.p.m. on these machines.

It is the principal object of this invention to provide a rotor spin-testing and balancing machine capable of turning large rotors at very high speeds, the structure of the machine being made rigid enough that the natural frequency of vibration of the machine is outside the vibration range attributable to rotation of the rotor, preferably above this range.

It is another very important object of the invention to provide a machine having a protective cover which may be drawn over the rotor being tested to provide ballistic protection in all directions in case of a rotor failure.

A more specific object of the invention is to provide cooperating rotor-supporting means and cover handling means such that the rotor-supporting means can be made rigid enough that its unavoidable deflections will not contribute an appreciable amount of vibration to the rotors being tested, and at the same time to provide a cover so designed as to afford as great a likelihood as possible that the cover can be withdrawn after a rotor failure has occurred during testing.

Another object of this invention is to provide a cantilever structure rigidly fixed in horizontal position and spaced above the bed of the machine, this cantilever serving as the supporting means for the rotor under test, and the protective cover being drawn over the rotor and the free end of the cantilever during such testing. A further object of the invention is to provide vibration damping means inside the cover and engageable with the cantilever when the cover is closed, said damping means adding support to the free end of the cantilever and being adjustable so that the natural period of vibration of the cantilever can be tuned away from the periods of vibrations occurring as a result of testing. The word "testing" as used in the broad sense in this specification is to be understood as referring both to spin-testing and to tests conducted for the purpose of rotor-balancing.

Another major object of the invention is to provide a cover which when drawn over the rotor and its supporting cantilever can be sealed and evacuated. The evacuation serves the purpose of reducing spurious vibrations occurring as a result of spinning the rotor in air, and further serves the purpose of reducing very significantly the amount of horsepower necessary to rotate such turbine rotors in the presence of air drag. The 2000 lb. turbo-jet compressor rotor referred to above requires 20,000 horsepower to turn it in its stator at an operating speed of around 5000–6000 r.p.m. In the absence of the stator, this horsepower is considerably less although still high. Evacuation of air from the closed cover provides a further very extensive saving in horsepower, which saving makes it more than worthwhile to go to the expedient of evacuating the air to a reasonable extent.

A further important object of the invention is to provide a versatile flexure suspension on the cantilever beam for the purpose of supporting the bearings in which the rotor is journaled during testing, the flexure suspension also carrying seismic-type vibration transducers associated with each bearing and measuring the degree of vibration transmitted therethrough.

An additional object of the invention is to provide flexure suspension locking means which can be applied from a remote position outside the cover to lock the suspension and thereby greatly increase the damping at the rotor-supporting bearings, this lock providing means for combatting excessive or dangerous vibration amplitudes. Moreover, the locking means is applied during spin-testing, as distinguished from balancing, to lock the main rotor-supporting bearings. Flexure of the suspension during spin-testing is undesirable since it can increase the likelihood of failure of the rotor by permitting a degree of freedom which would not exist during normal use, spin-testing usually being conducted before high speed balancing is attempted.

A further object of this invention is to provide a flexure suspension locking means which can be effectively applied even though high amplitude vibrations of the suspension system are taking place, such locking system damping out the vibrations and finally aligning the rotor-supporting bearings with the flexure suspension in its neutral position.

It is another major object of this invention to provide a spin-testing and balancing machine of the type described in which the axis of the rotor is horizontally disposed during testing. This is the position of the rotor in which it is normally operated, and, therefore, the horizontal orientation of the rotor provides the best balancing results. Moreover, orientation of the rotor in a horizontal plane makes it possible to provide identical flexure systems at each of the two main bearings. Vibration readings are taken primarily during balancing of the rotor, but in addition, vibration readings are frequently taken during spin-testing even though the flexure supports are locked. These latter readings are quantitatively inaccurate because of the amount of damping introduced by locking of the flexure system, but they provide a rough estimate of the extent of unbalance over the range of speed through which the rotor passes during spin-testing.

Other objects and advantages of this invention will become apparent during the following discussion of the drawings, wherein:

FIG. 4 is an enlarged elevation view of the flexure-support system, this view being taken looking along the axis of the rotor mounting bearings, and the view being shown partly in cross section.

FIG. 5 is a section view along line 5—5 of FIG. 4.

FIG. 6 is an enlarged view in section, showing a vibration damping means carried by the cover and engaging a socket in the outer end of the cantilever.

Figure 1:
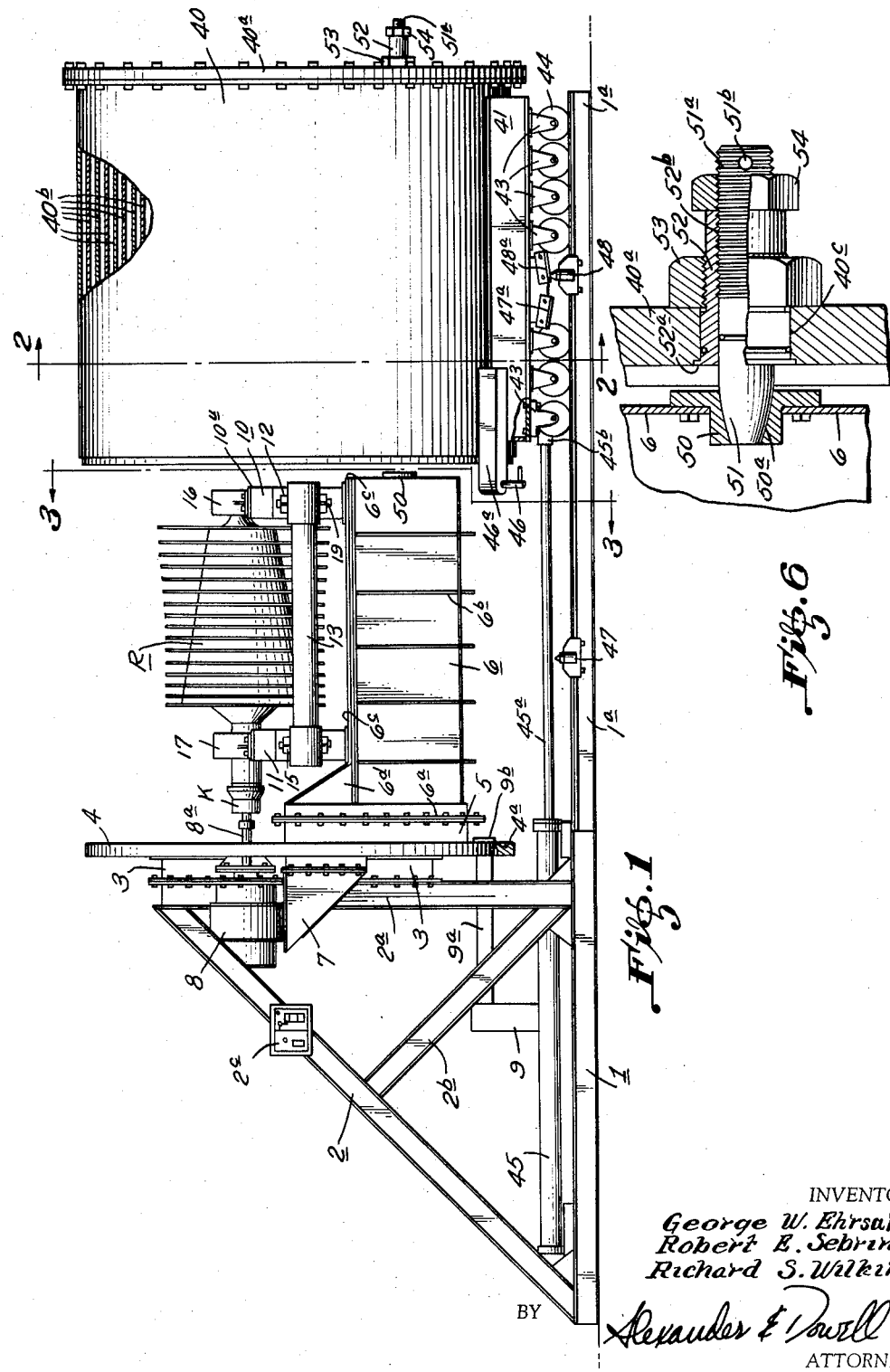
FIGURE 1 is a side elevation of the machine showing a rotor mounted in place in the bearings for testing and showing the protective cover in its open position.

Referring now to the practical embodiment of the invention illustrated in the drawings, FIG. 1 shows a testing machine having a bed 1 above which is erected a frame 2 including vertical frame members 2a and reinforcing diagonals 2b. Connected to the front of the vertical members 2a are beams 3 which in turn are connected to a circular plate 4 having on its front face an annular groove 4a containing an O-ring for the purpose hereinafter stated.

Also connected to the front surface of the plate 4 is a supporting flange member 5 to which is secured, as by riveting, bolting, etc., the mounting flange member 6a of the cantilever 6. This cantilever 6 is a rectangular box girder construction, see the end view shown in FIG. 3, and includes reinforcing ribs 6b which extend around the girder for the sake of stiffening the latter. On top of the girder are mounted plates 6c on which the flexure assembly is mounted, as will be described in connection with FIGS. 4 and 5. Triangular strengthening members 6d are added near the inner end of the cantilever member for the sake of stiffening the connection of the latter with the supporting flange members 6a. Behind the plate 4 and supported thereon is a bracket 7 which serves the purpose of mounting a prime mover 8 which may be an electric motor, a steam turbine, or other rotating means. The controls for this prime mover are not illustrated in the drawings. Also behind the plate 4 is located a vacuum pump 9 of conventional design, this pump being connected by a duct 9a to a passage through the plate 4, said passage terminating in a flange fitting 9b.

On top of the cantilever 6 is located the flexure suspension means which may be seen in FIGS. 1, 3, 4 and 5. This flexure suspension assembly includes a pair of yokes 10 and 11, the yoke 10 being best seen in FIG. 4. The yoke 11 is identical to the yoke 10, which latter yoke is described herein with particular reference to FIGS. 4 and 5. The yoke 10 comprises front and back vertical members 10a and 10b, the front member 10a, for example, including a horizontal portion 10c and spaced upright portions 10d and 10e, FIG. 4. These front and back upstanding members are closed at the tops of the upright portions by two horizontal plates 10m and 10n, the plate 10n being best illustrated at the right side of FIG. 4 in cross section. The front and back members 10a and 10b are joined together by side plates 10r and 10s and by a bottom plate 10t which rests on the plates 6c, as shown in FIGS. 1 and 4.

As may best be seen at the right side of FIG. 4, end plates 10r and 10s do not extend all the way down to the bottom plate 10t but terminate about half way down from the top so that a cross beam 12 may be passed through the yoke 10. This cross beam 12 terminates in semi-circular ends 12a and 12b which fit snugly against longitudinal tubular members 13 and 14. These tubular members are bolted to the cross beam 12 by annular clamps 13a and 14a which are screwed down by the bolts 13b and 14b. In addition to the cross beam 12 through the yoke 10, there is another cross beam 15 which passes through the yoke 11 and has similar clamping means which receives and secures the tubular members 13 and 14. The cross beams 12 and 15 and the tubular members 13 and 14 form an open framework comprising a cradle which in turn supports the bearing saddles 16 and 17. These saddles comprise two semi-circular pieces which clamp around the bearings in which the rotor R is to be tested is journaled. The bearing supported by the saddle 16 is held in place by another semi-circular member 16b secured in place by several bolts 16c in a manner well known per se. The saddle 16 is in turn connected to the cross beam 12 by other bolts 16d.

The cross beams 12 and 15 are suspended in the yokes 10 and 11, respectively, by a plurality of flexure rods, of which the rod 18 shown at the right side of FIG. 4 is typical. The rod 18 passes through a hole 12c in the top of the beam 12 and through another hole 12d in the bottom of the beam, the rod 18 being threaded at its lower end as at 18a and being prevented from pulling upwardly through the hole 12d by washer and nut 18b. The upper end of the rod is also threaded as at 18c and passes upwardly through a hole 10p. The hole 10p is counterbored at its upper end and a washer 18d extends into this counterbore and is a snug fit around the threaded portion 18c of the flexure rod. Above washer 18d is another washer 18e and above this washer is an adjustable nut 18f. The plate 10n also includes upstanding lugs 10x and 10y having set screws 10z passing therethrough. When the set screws 10z are screwed in and out they press against the washer 18e and move the upper portion of the flexure rod around through small distances with respect to the center of the hole 10p. Two other upstanding lugs and adjustment screws (not shown) are provided at right angles to the lugs 10x and 10y for moving the upper support of the flexure rod in directions axial of the main bearings. Each flexure rod can thus be adjusted somewhat as to its position in a horizontal plane, and the nuts 18b and 18f permit adjustment of the length of the flexure rods so that all of the flexure rods sustaining the cradle, comprising the cross beams 12 and 15 and tubular members 13 and 14, can be adjusted to align the position of the rotor. The outer ends of the cross beams 12 and 15 also include downwardly facing L-shaped brackets 19 and 20 for the purpose hereinafter described.

On the upper surface of each cross beam is located an upstanding bracket 21, as shown in FIG. 4 to the right, which bracket supports a seismic-type vibration detector 22. There are two such detectors, including the detector 22 on the beam 12 and a similar detector (not shown) on the beam 15, these detectors being connected to electronic indicating equipment for measuring and indicating the amount of vibration of the respective beams 12 and 15. This electronic equipment may be one of several different types and is not illustrated in the drawings. At the other end of the beam 12 is another L-shaped bracket 23 located opposite a switch 24 which is secured to the yoke 10 and is connected to a warning signal (not shown) which may be associated with said electronic equipment. This warning switch and circuit serves the purpose of indicating excessive vibration of the beams 12 and 15 so that the beams may be locked in the manner hereinafter discussed by a lock means which is illustrated in FIGS. 4 and 5.

In these figures two end plates 10u and 10v are illustrated, these plates carrying sleeve bearings 25 and 26. Plungers 27 and 28, respectively, pass through these bearings, and at the outer end of each of these plungers is an adjustable abutment, these abutments being labeled 29 and 30. By adjustment of these abutments and of nuts 29a and 30a the abutments may be positioned slightly for the purpose hereinafter stated.

In the center of FIG. 5 there is a linkage arm 31 which is pivotally connected as at 32 to a reinforcing plate 33 connected with the bottom plate 10t of the yoke 10. This linkage connects with two arms 35 and 36 such that when the linkage 31 is rotated around the pivot 32, the arms 35 and 36 will extend or retract the plungers 27 and 28 in unison. In order to actuate such rotation of the linkage 31 a conventional hydraulic cylinder 37 is connected between the plate 10a of the yoke 10 and the pivot point 38 of the linkage 31. It will thus be seen that when piston rod 37a of the hydraulic cylinder is extended outwardly the plungers 27 and 28 will likewise be extended to abut the brackets 19 and 20 carried by the cross beam 12 for the purpose of locking the cross beam against horizontal displacement. Conversely, when the piston rod 37a is retracted into the hydraulic cylinder 37 the linkage 31 will be rotated counterclockwise and plungers 27–28 will be retracted so as to move the abutments 29 and 30 away from the brackets 19 and 20 and thereby permit oscillation in a horizontal direction of the beam 12 with respect to the beam 10, the beam being supported at that time solely on the flexure rods.

At the other end of the flexure assembly, within the yoke 11 and acting upon the cross beam 15 there is located another lock assembly which is identical to the one just described. The hydraulic piston which actuates the plunger locking assembly located in the yoke 11 is connected in parallel with the hydraulic cylinder 37 which is located within the yoke 10, so that the two cylinders are actuated in unison. The supply of pressure to these cylinders can be controlled at a panel such as panel 2c, which panel will have hydraulic lines connected to the actuating pistons and deriving hydraulic pressure from a source (not shown). It is, however, to be pointed out that the control panel is located in a position outside the protective cover which position is accessible during testing of the rotor.

Figure 2:
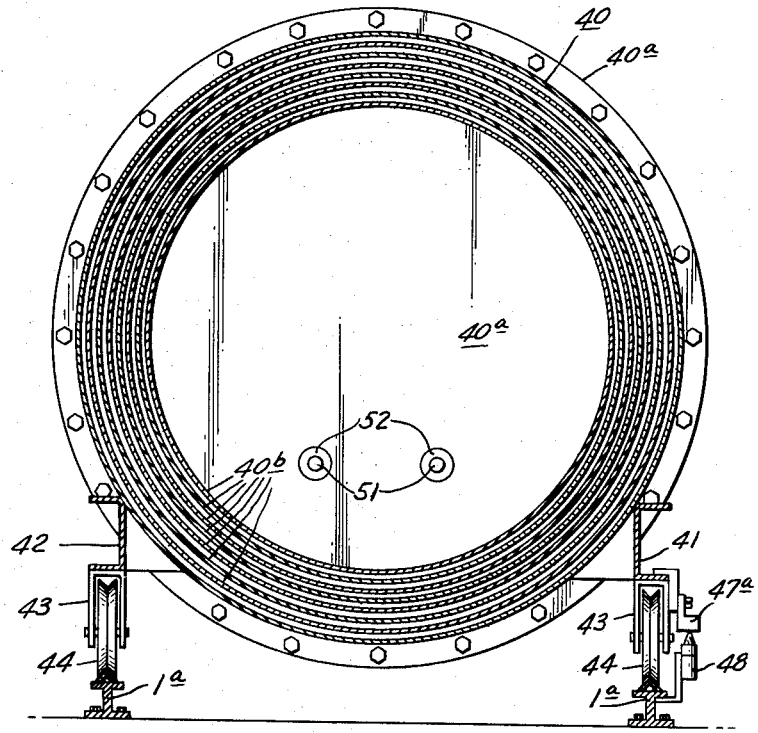
FIG. 2 is an enlarged section view taken along line 2—2 of FIG. 1.
Figure 3:
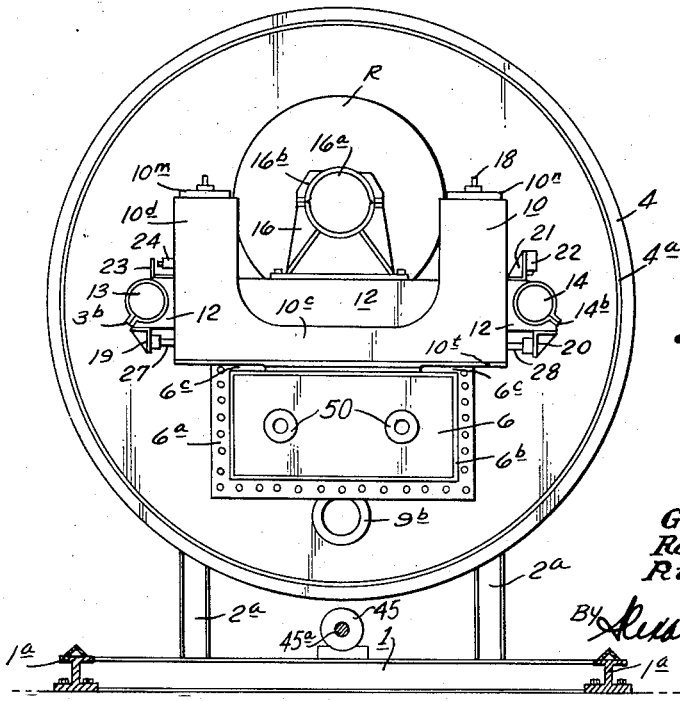
FIG. 3 is an enlarged section view taken along line 3—3 of FIG. 1.

Referring to FIGS. 1, 2 and 3, it will be seen that located to the right of the machine bed 1 is a pair of tracks 1a, these tracks extending outwardly beyond the end of the cantilever box girder 6. The tracks serve the purpose of supporting a protective cover 40 which comprises a large tank having its right end enclosed by a plate 40a and having an open left end. This cover actually contains a plurality of cylinders 40b one within the other, and serves the dual purpose of permitting evacuation of the air space therewithin when it is closed and sealed against the left end cover plate 4, and also serves the purpose of protection against flying parts in case of centrifugal failure of the rotor R while being tested. For adequate protection, it is necessary that the total tank thickness at the cylindrical portion thereof be sufficient to contain the energy release but in view of the impracticability of rolling a thick plate to a cylindrical form, the tank is fabricated of a plurality of thinner plates located one within the other. These walls are generally indicated by the reference character 40b and can best be seen in FIGS. 1 and 2. The outermost of these tanks is supported by channel members 41 and 42 which carry a plurality of U-shaped brackets generally represented by the reference character 43, in which are journaled a plurality of wheels 44 so as to permit reciprocation of the cover 40 back and forth on the tracks 1a.

Reciprocation of the cover 40 on the tracks 1a is accomplished by means of a hydraulic cylinder 45 having a piston rod 45a which is extended and retracted by hydraulic pressure, the outer end of the piston rod 45a being connected as at 45b to the base of the cover 40. The hydraulic lines which operate the piston 45 are not shown, as in the case of those which operate the piston 37, but the operation of this piston may also be conveniently controlled from the panel. When the cover is pulled over the test rotor and the cantilever box girder, it may be held in place against the plate 4 by means of a lock 46 which is secured by a beam 46a to the cover, this lock passing behind the plate 4 when it is turned inwardly. The O-ring in the annular slot 4a in the plate 4 seals against the annular end of the cover 40 to produce a fluid-tight seal so that the vacuum pump 9 may exhaust air from within the cover 40 through the duct 9a which terminates on the cover side of the plate 4 in the flange 9b.

On the track 1a are located two limit switches or valves 47 and 48 which are actuated by brackets 47a and 48a attached to the cover. These limit switches 47–48 serve the purpose of controlling the cylinder 45 in such a manner as to cause the cover to slow up when it is beginning to reach the limit of its travel in either direction, the cover being extremely heavy and therefore requiring deceleration in order to prevent serious damage to the assembly.

As can best be seen in FIG. 6, two sockets 50 are fixed in the end of the cantilever 6, and each socket 50 has an internal bore 50a which is complementary in shape with a damping pin 51 which is threaded at its other end 51a. Each pin 51 passes through the right end plate 40a of the cover 40 which has holes 40c therethrough in which are mounted bushings 52 each held in place by a flange 52a and a nut 53. Each bushing is internally threaded at 52b and the pin 51 is provided with a hole 51b in its outer end through which a bar may be inserted for the purpose of rotating the pin 51 with respect to the bushing 52 and thereby applying greater or lesser pressure to the associated sockets 50 in the cantilever 6. A nut 54 serves to lock the pin 51 against accidental rotation in the bushing 52. A plurality of O-rings are provided in slots in the appropriate members in order to prevent leakage of air through this assembly.

*In Operation*

In operation, a rotor R to be tested is mounted in the bearings of the flexure suspension, and the shaft of the rotor is coupled by a suitable coupling K to the shaft 8a of the prime mover 8. During this time, the flexure suspension locks, as shown in FIG. 5, are locked so as to steady the cradle on which the main bearings are supported to as great an extent as possible. When the rotor R has been mounted in these bearings, the cover 40 is drawn over the entire cantilever 6 and rotor by the piston 45 which retracts the piston rods 45a from the position shown in FIG. 1 and pulls the cover 40 until it contacts the end plate 4 and seals against the rubber O-ring 4a. In this position, the clamps 46 may be clamped for the purpose of preventing accidental disengagement. When the seal has been completed, the vacuum pump is started and sufficient air is exhausted from the space within the cover 40 to permit the rotor R to be turned up to the desired speed without undue air drag. The cover also serves the purpose of protecting personnel and equipment in the event the rotor should fail during high speed spin-testing.

When the cover is closed and evacuated, the force of the air pressure holding the cover against the plate 4 is enormous and at this time the pin 51 may be positioned within the threaded bushing 52 to tune the natural rate of vibration of the cantilever to a value above the frequencies encountered during spin-testing or balancing. The vibration damper assembly, as shown in FIG. 6, is included only on machines having a cantilever 6 which is long with respect to its width and depth. On machines which handle smaller rotors, or shorter rotors, the assembly shown in FIG. 6 would be unnecessary and would therefore not be included. At any rate, adjustment to the appropriate pressure of the pin 51 in the socket 50 is in the nature of a preliminary adjustment when the machine is installed and should require little further attention.

When the cover is closed and the air therewithin has been sufficiently exhausted, the prime mover 8 is started and the rotor R is accelerated over its useful operating range and then accelerated beyond that range into the overspeed range. This is a test to determine whether or not the rotor will fly apart and whether or not it will have excessive vibration at various speeds. During the spin-testing, the flexure system locks shown in FIG. 5 will remain in extended position so as to damp the vibrations which tend to appear in the beams 12 and 15. However, despite the fact that this heavy damping is introduced, a set of readings may be made over the speed range to provide a rough determination of the amount of vibration to which the rotor is subjected at the various speeds. The seismic detectors 22 along with their associated electronic equipment (not shown) can perform this function. When the spin-testing of the rotor has been completed, the speed of the rotor is then reduced below the overspeed range and the flexure suspension locks, FIG. 5, are released. A run is then made over the useful range of the rotor for the purpose of measuring and recording its vibration pattern at various speeds in the absence of damping of the flexure suspension. The speed at which the rotor is to be balanced most carefully may then be selected and at this speed the degree and angular position of the unbalance of the rotor is determined. The rotor is then stopped and the cover 40 opened, and the weight distribution of the rotor is readjusted toward balance. Each time it is necessary to retest the rotor after such adjustment of its weight distribution, the cover 40 is pulled back over the cantilever and rotor and the prime mover 8 started up for the purpose of bringing the rotor back up to the speed at which balance is to be perfected.

It is very important that the cantilever be so rigidly mounted that its deflection is reduced to a minimum. Undoubtedly the support of the cantilever could be stiffened if trackways were placed inside the cover 40 to support the cantilever at a plurality of places along its length, but in the event of failure of a rotor, these trackways would tend to become cluttered with the broken parts of the rotor and such clutter would prevent withdrawal of the cover for the purpose of removing the fractured rotor. Other instrumentation than that discussed here is, of course, contemplated, but such instrumentation is believed to form no part of the present invention which relates principally to the mechanical structure of the testing machine.

We do not limit our invention to the exact form shown in the drawings, for obviously changes may be made within the scope of the appended claims.

We claim:

1. A machine for spin-testing and for testing the dynamic balance of a rotor mounted on a shaft, comprising a bed; a frame fixed on said bed and extending vertically thereabove; a cantilever disposed horizontally in spaced relation to said bed and fixed at its inner end to said frame; bearing support means carried on said cantilever; a pair of spaced shaft-supporting bearings aligned on a horizontal axis and carried by said support means; drive means for rotating said shaft in said bearings; vibration detecting means connected with said support means; and a protective cover reciprocably supported by said bed and being open at the end facing in the direction of said frame, said cover at the inner end of its reciprocation being drawn over the cantilever and the rotor being tested.

2. In a machine as set forth in claim 1, said frame being ridigly secured to said bed and said cantilever comprising a rigid box structure having mounting members mutually spaced transversely with respect to the length of the cantilever and rigidly secured to said frame.

3. In a machine as set forth in claim 1, said bearing support means comprising spaced uprights fixed on said cantilever, a cradle having spaced crossarms supporting said bearings, the cradle being disposed between said uprights; flexure bars each fixed at one end in the cradle and at the other end in an upright, whereby said cradle may vibrate substantially horizontally through small displacements; and flexure locking means comprising at least one pair of rods mounted between said uprights and guided for reciprocation in the directions of said displacements; linkage means connected between each pair of rods for reciprocating the latter in unison in opposite directions, the outer ends of the rods when extended abutting said cradle and arresting horizontal displacements thereof; and power means connected to said linkage means for selectively reciprocating said rods.

4. In a machine as set forth in claim 2, said cover comprising a metal tank open at one end and closed at the axially opposite end, said tank being disposed with its axis parallel with said cantilever, and roller means interposed between the tank and said bed to facilitate reciprocation of the tank to cover the cantilever.

5. In a machine as set forth in claim 4, a metal plate supported by said frame and disposed normal to said cantilever, said plate being complementary in shape to the open end of said tank and sealing the latter when the tank is drawn over the cantilever, and air evacuating pump means connected by a duct with the space within said tank.

6. In a machine as set forth in claim 1, said cantilever having engaging means at its outer end and said cover having complementary engaging means mounted therewithin whereby said engaging means mate when the cover is drawn over said cantilever to steady the outer end of the cantilever.

7. In a machine as set forth in claim 6, at least one of said complementary engaging means being adjustable in a direction longitudinally of said cantilever whereby the pressure applied to the end of the cantilever through said engaging means can be varied to detune the natural frequency of the cantilever away from the components of frequency generated by rotation of said rotor.

8. A machine for testing a rotor at high angular velocities, comprising a bed; a plate fixed substantially normal to said bed; a cantilever fixed to and extending outwardly from said plate in spaced relation to said bed; journal means on said cantilever for supporting said rotor; drive means for rotating said rotor in said journal means; a cover reciprocably supported by said bed and being large enough to be drawn over and enclose said cantilever and rotor being tested, said cover comprising a metal tank open at its end facing toward said plate and closed at the axially opposite end, said tank being disposed with its axis perpendicular to said plate and the plate being complementary in shape to the open end of said tank and sealing the latter when the tank is drawn over the cantilever; and air evacuating pump means connected by a duct with the space within said tank.

9. A machine for testing a rotor at high angular velocities, comprising a bed; a plate fixed substantially normal to said bed; a cantilever fixed to and extending outwardly from said plate in spaced relation to said bed; journal means on said cantilever for supporting said rotor; drive means for rotating said rotor in said journal means; a cover reciprocably supported by said bed and open at its end facing toward said plate, the cover being large enough to be drawn over and enclose said cantilever and rotor being tested; said cantilever having engaging means at its outer end and said cover having complementary engaging means mounted therewithin, whereby said engaging means mate when the cover is drawn over said cantilever to steady the outer end of the cantilever, and at least one of said complementary engaging means being adjustable in a direction longitudinally of said cantilever whereby the pressure applied to the end of the cantilever through said engaging means can be varied to detune the natural frequency of the cantilever away from the components of frequency generated by rotation of said rotor.

10. A machine for testing a rotor at high angular velocities, comprising a bed; a plate fixed substantially normal to said bed; a cantilever fixed to and extending outwardly from said plate in spaced relation to said bed; journal means on said cantilever for supporting said rotor; drive means for rotating said rotor in said journal means; a cover reciprocably supported by said bed and open at its end facing toward said plate, the cover being large enough to be drawn over and enclose said cantilever and rotor being tested; a power driven actuator connected between said bed and said cover for selectively reciprocating the latter on the former.

11. A machine for spin-testing a rotor mounted on a shaft, comprising a bed; a frame fixed on said bed and extending vertically therefrom; a cantilever disposed horizontally in spaced relation to said bed and fixed at its inner end to said frame; bearing support means carried on said cantilever; a pair of spaced shaft-supporting bearings aligned on a horizontal axis and carried by said support means; drive means for rotating said shaft in said bearings; a protective cover reciprocably supported by said bed and being open at the end facing in the direction of said frame, said cover at the inner end of its reciprocation being drawn over the cantilever and the rotor being tested and comprising a metal tank open at one end and closed at the axially opposite end with its axis parallel with said cantilever; roller means interposed between the tank and said bed to facilitate reciprocation of the tank to cover the cantilever, a metal plate supported by said frame and disposed normal to said cantilever, said plate being complementary in shape to the open end of said tank and sealing the latter when the tank is drawn over the cantilever; and air evacuating pump means connected by a duct with the space within said tank.

12. A machine for spin-testing a rotor mounted on a shaft, comprising a bed; a frame fixed on said bed and extending vertically therefrom; a cantilever disposed horizontally in spaced relation to said bed and fixed at its inner end to said frame; bearing support means carried on said cantilever; a pair of spaced shaft-supporting bearings aligned on a horizontal axis and carried by said support means; drive means for rotating said shaft in said bearings; a protective cover reciprocably supported by said bed and being open at the end facing in the direction of said frame, said cover at the inner end of its reciprocation being drawn over the cantilever and the rotor being tested, said cantilever having engaging means at its outer end and said cover having complementary engaging means mounted therewithin whereby said engaging means mate when the cover is drawn over said cantilever to steady the outer end of the cantilever, at least one of said complementary engaging means being adjustable in a direction longitudinally of said cantilever whereby the pressure applied to the end of the cantilever through said engaging means can be varied to detune the natural frequency of the cantilever away from the components of frequency generated by rotation of said rotor.

References Cited in the file of this patent

UNITED STATES PATENTS

| | | |
|---|---|---|
| 1,332,537 | Becraft et al. | Mar. 2, 1920 |
| 1,768,167 | Sweetland | June 24, 1930 |
| 2,343,383 | Martin et al. | Mar. 7, 1944 |
| 2,394,766 | Halford | Feb. 12, 1946 |
| 2,547,764 | Lindenberg et al. | Apr. 3, 1951 |
| 2,878,942 | Whitmore | Mar. 24, 1959 |
| 2,882,717 | Brown | Apr. 21, 1959 |

FOREIGN PATENTS

| | | |
|---|---|---|
| 664,160 | Great Britain | Jan. 2, 1952 |